(12) United States Patent
Geng et al.

(10) Patent No.: US 11,061,188 B1
(45) Date of Patent: Jul. 13, 2021

(54) FIBER COUPLER AND METHOD FOR FABRICATION OF THE SAME

(71) Applicant: AdValue Photonics, Inc., Tucson, AZ (US)

(72) Inventors: Jihong Geng, Tucson, AZ (US); Bryson Case, Tucson, AZ (US); Shibin Jiang, Tucson, AZ (US)

(73) Assignee: AD VALUE PHOTONICS, INC., Tucson, AZ (US)

( * ) Notice: Subject to any disclaimer, the term of this patent is extended or adjusted under 35 U.S.C. 154(b) by 0 days.

(21) Appl. No.: 16/806,237

(22) Filed: Mar. 2, 2020

(51) Int. Cl.
*G02B 1/02* (2006.01)
*G02B 1/00* (2006.01)
*G02B 6/28* (2006.01)

(52) U.S. Cl.
CPC .......... *G02B 6/2856* (2013.01); *G02B 6/2852* (2013.01)

(58) Field of Classification Search
CPC ....... G02B 6/2856; G02B 6/38; G02B 6/2852
USPC .......................................................... 385/24
See application file for complete search history.

(56) References Cited

U.S. PATENT DOCUMENTS

| | | | | |
|---|---|---|---|---|
| 4,726,643 A * | 2/1988 | Imoto | ................... | G02B 6/2835 359/900 |
| 4,755,037 A * | 7/1988 | Bjornlie | ............... | G02B 6/2835 359/900 |
| 4,798,438 A * | 1/1989 | Moore | ................. | G02B 6/2835 385/30 |
| 4,799,949 A * | 1/1989 | Keck | .................... | C03B 23/0473 65/409 |
| 4,900,114 A * | 2/1990 | Mortimore | ............. | G02B 6/262 385/96 |
| 4,997,248 A * | 3/1991 | Stowe | .................. | G02B 6/2835 385/43 |
| 5,011,251 A * | 4/1991 | Miller | .................. | G02B 6/2856 385/43 |
| 5,177,803 A * | 1/1993 | Newhouse | ........... | G02B 6/2552 385/126 |
| 5,224,977 A * | 7/1993 | Anjan | .................. | G02B 6/2843 65/152 |
| 5,268,979 A * | 12/1993 | Weidman | ............. | G02B 6/2856 385/42 |
| 5,295,210 A * | 3/1994 | Nolan | .................. | G02B 6/2856 385/43 |
| 5,339,372 A * | 8/1994 | Miller | .................. | G02B 6/2856 385/29 |
| 5,454,057 A * | 9/1995 | Arima | .................. | G02B 6/2835 385/43 |
| 5,761,234 A * | 6/1998 | Craig | ................ | H01S 3/094003 372/33 |

(Continued)

*Primary Examiner* — Kaveh C Kianni
(74) *Attorney, Agent, or Firm* — Yakov Sidorin; Quarles & Brady LLP (57) ABSTRACT

A method for fabricating an optical fiber coupler device includes a step of tangibly fusing a first outer cladding of a first optical fiber with a second outer cladding of a second optical fiber as a result of pulling and heating the first and second optical fibers at lengths not exceeding 3 mm to form a first region of structurally-integrated with one another first and second optical fibers, and a step of heating a second, neighboring region of these fibers to configure the device to transmit optical power of at least about a hundred Watts and up to at least a kWatt from the input end to the output end with a value of throughput loss not exceeding 0.2 dB.

19 Claims, 4 Drawing Sheets

(56) References Cited

U.S. PATENT DOCUMENTS

| | | | | |
|---|---|---|---|---|
| 5,809,189 A * | 9/1998 | Murphy | G02B 6/2856 | 385/123 |
| 5,864,644 A * | 1/1999 | DiGiovanni | H01S 3/094003 | 385/43 |
| 5,930,435 A * | 7/1999 | Laming | H01S 3/06708 | 385/126 |
| 5,987,201 A * | 11/1999 | Chen | G02B 6/2835 | 385/43 |
| 6,148,129 A * | 11/2000 | Pan | G02B 6/2835 | 385/42 |
| 6,181,466 B1 * | 1/2001 | Franzoso | G02B 6/2835 | 359/341.3 |
| 6,282,342 B1 * | 8/2001 | Berkey | G02B 6/03644 | 385/43 |
| 6,324,326 B1 * | 11/2001 | Dejneka | G02B 6/1228 | 359/341.1 |
| 6,434,302 B1 * | 8/2002 | Fidric | G02B 6/2856 | 385/43 |
| 6,631,234 B1 * | 10/2003 | Russell | G02B 6/2552 | 385/125 |
| 6,731,842 B2 * | 5/2004 | Chen | G02B 6/2835 | 385/31 |
| 7,272,956 B1 * | 9/2007 | Anikitchev | G02B 6/2835 | 385/115 |
| 7,460,755 B2 * | 12/2008 | Bruesselbach | G02B 6/04 | 385/115 |
| 8,160,415 B2 * | 4/2012 | Shkurikhin | H01S 3/06708 | 385/115 |
| 8,514,485 B2 * | 8/2013 | Rothenberg | H01S 3/06754 | 359/341.1 |
| 8,515,220 B1 * | 8/2013 | Khitrov | G02B 6/2856 | 385/14 |
| 9,063,289 B1 * | 6/2015 | Farmer | G02B 27/106 | |
| 2002/0094168 A1 * | 7/2002 | Cai | G02B 6/12007 | 385/43 |
| 2002/0157422 A1 * | 10/2002 | Corio | G02B 6/2835 | 65/385 |
| 2003/0048991 A1 * | 3/2003 | Gonthier | G02B 6/2835 | 385/43 |
| 2005/0002614 A1 * | 1/2005 | Zhong | G02B 6/2835 | 385/50 |
| 2005/0094952 A1 * | 5/2005 | Gonthier | G02B 6/14 | 385/100 |
| 2005/0105854 A1 * | 5/2005 | Dong | H01S 3/06754 | 385/46 |
| 2005/0185888 A1 * | 8/2005 | Willig | G02B 6/2835 | 385/43 |
| 2005/0207454 A1 * | 9/2005 | Starodoumov | H01S 5/4062 | 372/4 |
| 2005/0207455 A1 * | 9/2005 | MacCormack | H01S 3/06754 | 372/6 |
| 2006/0187541 A1 * | 8/2006 | Starodoumov | H01S 3/06708 | 359/341.32 |
| 2006/0263024 A1 * | 11/2006 | Dong | H01S 3/06729 | 385/125 |
| 2007/0206909 A1 * | 9/2007 | Wetter | G02B 6/36 | 385/92 |
| 2007/0212006 A1 * | 9/2007 | Wysocki | G02B 6/04 | 385/115 |
| 2007/0230881 A1 * | 10/2007 | Tammela | G02B 6/2826 | 385/115 |
| 2007/0237453 A1 * | 10/2007 | Nielsen | G02B 6/02338 | 385/28 |
| 2007/0280597 A1 * | 12/2007 | Nakai | G02B 6/2835 | 385/43 |
| 2008/0050069 A1 * | 2/2008 | Skovgaard | G02B 6/2856 | 385/39 |
| 2008/0193093 A1 * | 8/2008 | DiGiovanni | G02B 6/0365 | 385/115 |
| 2008/0267560 A1 * | 10/2008 | DiGiovanni | G02B 6/2856 | 385/28 |
| 2009/0080469 A1 * | 3/2009 | Nikolajsen | H01S 3/094003 | 372/6 |
| 2009/0154881 A1 * | 6/2009 | Salokatve | G02B 6/25 | 385/46 |
| 2009/0154882 A1 * | 6/2009 | Salokatve | G02B 6/2835 | 385/50 |
| 2009/0175301 A1 * | 7/2009 | Li | B23K 26/0626 | 372/6 |
| 2009/0202204 A1 * | 8/2009 | Nielsen | G02B 6/2551 | 385/43 |
| 2010/0278486 A1 * | 11/2010 | Holland | G02B 6/262 | 385/43 |
| 2011/0032602 A1 * | 2/2011 | Rothenberg | H01S 3/2383 | 359/341.1 |
| 2011/0274435 A1 * | 11/2011 | Fini | H04J 14/02 | 398/139 |
| 2012/0127563 A1 * | 5/2012 | Farmer | H01S 3/06754 | 359/341.3 |
| 2012/0262781 A1 * | 10/2012 | Price | G02B 6/14 | 359/341.3 |
| 2014/0119694 A1 * | 5/2014 | Abedin | G02B 6/262 | 385/43 |
| 2014/0205236 A1 * | 7/2014 | Noguchi | G02B 6/32 | 385/33 |
| 2014/0294345 A1 * | 10/2014 | Kopp | G02B 6/30 | 385/24 |

* cited by examiner

FIBER COUPLER AND METHOD FOR FABRICATION OF THE SAME

STATEMENT OF FEDERALLY-SPONSORED RESEARCH AND DEVELOPMENT

This invention was made with government support under contract number HQ014717C7337 awarded by Department of Defense. The government has certain rights in the invention.

TECHNICAL FIELD

This invention relates generally to fused fiber couplers and, in particular, to a fused fiber coupler characterized by low optical loss and high-power throughput.

RELATED ART

Fiber lasers configured to generate tens of even hundreds kW of optical output power are desired and used as laser sources in many industrial and military applications. Methodologies ensuring such high optical output power from a fiber-based laser system require the ability to spatially combine multiple output beams from a fiber-amplifier array (especially in a master oscillator power amplifier, or MOPA, configuration, well known in related art, in which a master laser (or seed laser) is complemented by an optical amplifier to boost the output power, when each of the multiple beams carries multiple kW of output power). Two methodologies worthy practical attention are referred to as a coherent-beam-combining technique, and a spectral-beam-combining technique. These approaches combine multiple laser-light outputs from an array of multi-kW fiber amplifiers, adding such optical outputs together to achieve tens and hundreds of kW of optical output power.

To effectively implement such "combining"- and, specifically, to monitor and control such high-level output power, phase, path length, and polarization of light output of the so-combined multi-kW fiber amplifiers—high-power fiber optical tap couplers are required. In each element or unit of a kW-level non-polarization-maintaining (non-PM) fiber amplifier array, for example, it is necessary to pick off (tap off) a small amount of laser output power from each individual constituent fiber amplifier for monitoring of the phase and polarization states of the corresponding light, and to create a feedback loop to actively control optical path length and input polarization state of a given non-PM fiber amplifier for subsequent coherent beam combining. In another example—and in reference to spectral beam-combining systems (requiring linearly polarized output for efficient spectral beam-combining with the use of, for example, diffraction grating), a polarization-maintaining fiber tap couplers capable of carrying/handling high optical power are needed. This begs a question of creation of fiber optical tap couplers that can boast i) a large-core throughput optical fiber (with core diameter of about 15 microns or larger) and/or a highly-multimode throughput optical fiber (typically, a large-mode-area fiber, supporting modes with mode field diameters of about 15 microns at 1 micron wavelength) that is capable of carrying kW-level optical power) and ii) a tap fiber (small-core single-mode fiber) configured to tap a very small portion of the kW-level throughput power (on the order of 1 to 10 ppm, for example). Currently-used methods for fabrication of fiber couplers are well known to be severely limited in this respect.

SUMMARY OF THE INVENTION

Embodiments of the invention provide a solution to the problem of inability of a conventional methodology of fabrication of a fiber coupler to produce, with the use of a MMF, a low-loss tap fiber coupler configured to reliably handle optical powers at a level of multiple Watts.

Embodiments include a method for fabricating an optical fiber coupler device that includes an input end, an output end, and a tap end, and that is characterized by a tap coupling ratio. The method includes the steps of a) tangibly fusing a first outer cladding of a first optical fiber with a second outer cladding of a second optical fiber (as a result of pulling and heating the first and second optical fibers at lengths not exceeding 3 mm) to form a first region of structurally-integrated with one another first and second optical fibers, and b) heating a second region of the first and second optical fibers. As a result of such operation, the target coupler device is configured to transmit optical power of at least 40 Watts from the input end to the output end with a value of throughput loss of optical power not exceeding 0.2 dB. Here, the second region neighboring the first region. The process of heating of the second region may be carried out, as an option, after the step of tangibly fusing the first outer cladding with the second outer cladding has been accomplished. The methodology satisfies at least one of the following conditions: i) the process of heating of the second region is devoid of (that is, is not accompanied by) pulling any of the first and second optical fibers in said second region; ii) the process of heating of the second region is accompanied by pulling the first and second optical fibers along lengths of fibers that do not exceed 1 mm; and iii) the process of tangibly fusing includes pulling and heating the first and second optical fibers at lengths that do not exceed 2 mm. As a result of the proposed methodology, the fiber tap coupler has been demonstrated to have a value of throughput loss of optical power not exceeding 0.1 dB across a range of input optical powers from about 10 Watts to a least about and exceeding 80 Watts.

BRIEF DESCRIPTION OF THE DRAWINGS

Implementations of the invention will become more apparent from the detailed description sent forth below when taken in conjunction with the drawings, in which like elements bear like reference numerals, and of which.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another

DETAILED DESCRIPTION

Fabrication of fiber-based couplers employs different fiber-processing techniques that conventionally include fusing, polishing, and etching, to name just a few. One processing technique—a so-called fused fiber biconical tapering technique—has been used in fabricating a family of commercial fused fiber products that include at least couplers/splitters, wavelength division multiplexing (WDM) components, polarization combiners/splitters, fixed attenuators, and other special fused products, all of which aggregately are herein referred to as "fused fiber coupler devices" or "fiber fused couplers", for short.

Fiber-optic coupling devices based on the fused biconical-taper structures have been commonly used as low-loss branching points for light circuits. The principle of operation of the multimode versions of these devices involves the conversion of higher-order core-guided modes to cladding modes with subsequent recapture of the radiated light downstream by two or more fiber cores. In comparison, the coupling mechanism in a single-mode device typically involves either wave-front division or evanescent-wave interactions of the guided light.

Figure 1:
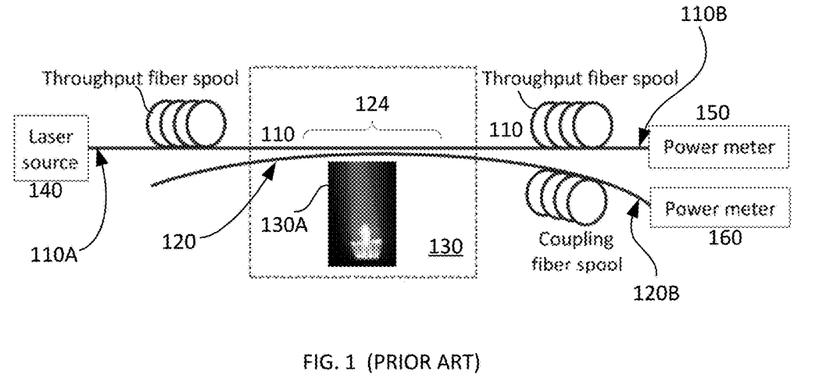
FIG. 1 illustrates schematically a conventional setup used for fabrication of a fused fiber coupler.

Single-mode fused fiber couplers are typically fabricated by tapering two single-mode fibers to form a biconically-shaped fiber taper while appropriately heating these two fibers, as known in the art. FIG. 1 provides an illustration to a conventional setup 100 used for fabrication of a fused fiber coupler. Here, the two optical fibers to be operationally united are the throughput fiber 110 (shown forming a spool) and the tap or coupling fiber 120, brought in proximity of one another along the lengths of the fibers to form a fiber bundle 124 at the operational fiber-coupler workstation 130, which is equipped with the appropriate optical-fiber heating device 130A such as an oven, for example.

During the so-called fused biconical taper (FBT) process, an assembly or bundle 124 of, for example, two single-mode fibers 110, 120 (formed over at least 10 mm or a much longer length of the fibers) is appropriately heated and pulled along the fiber axes to form fiber tapers in the region in which the fibers are tangibly integrated/contacted with one another such that the overall cross-sectional dimension of the fiber bundle is substantially smaller or thinner than the cross-sectional dimension of a constituent fiber itself prior to the process of forming a taper. The spatial taper is preferably formed with an adiabatically-tapered cross-sectional profile in the tapering region, to achieve desired efficiency of optical coupling between the cores of the two fibers 110, 120 for low-loss fused fiber couplers. (The end 110A of the throughput fiber that, in operation of the resulting coupler is used for coupling the optical energy into the coupler, is referred to herein as an input end of the coupler device. The opposite end 110B of the throughput fiber 110 from which the optical energy, delivered through the resulting coupler device is collected as optical throughput, is referred to as an output end of the optical coupler. The output end 120B of the tap or coupling fiber 120 (from which the tapped-out portion of the optical energy is collected by the power meter 160) is referred to herein as a tap end of the output coupler.) This technological approach for fabricating a fiber tap couplers has been widely used in both telecom-related and fiber-laser industries. Both of these industries require tapping a small portion of laser power (shown to propagate from the laser source 140 optically coupled into the throughput fiber 110) either from a data transmission line or a delivery fiber of a fiber laser/amplifier for performance monitoring (with the use of optical detectors or power meters 150, 160). Yet it is recognized that the optical-power handling capability of the fiber-system resulting from such fabrication process is very limited (with a maximum handling power at a level of a few Watts or less). Indeed, to achieve the desired low-loss performance, the tapered fiber is typically formed so thin (with an outer fiber diameter of less than 50 microns in the tapering region) that such taper simply cannot withstand the demands of and cannot be used for various practical kW-level applications of fiber amplifiers.

Figure 2:
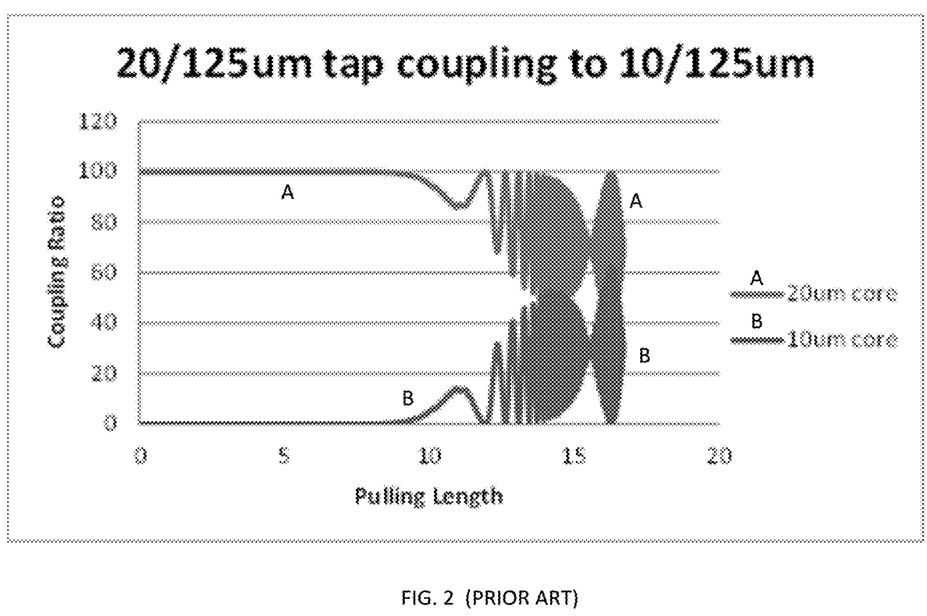
FIG. 2 contains plots illustrating optical power coupling between a throughput fiber (20/125 um) and a coupling fiber (10/125 um) with the use of a typical fused biconical taper (FBT) based fiber coupler. Notably, no optical coupling occurs at a pulling length of about or less than 4 mm.

FIG. 2 contains plots evidencing the efficiency of coupling of optical power with the use of a fiber tap coupler, conventionally fabricated from optical fibers having the identified characteristics. Notably, as seen in FIG. 2, it is well recognized in related art that conventionally-fabricated fiber tap couplers require to have at least 10 mm of pulled length to provide for any substantial coupling, and at pulled lengths below this approximate numerical limit the coupling is simply not effectuated.

A person of ordinary skill in the art will also readily recognize that another limitation on the process of fabrication of commercial fused fiber couplers is imposed by the current choice of the process in related industry. The use of such conventional process is limited to utilizing single-mode fibers for such fiber tap coupler fabrication (which is a logical choice to achieve thin tapering regions of the coupler). In stark contradistinction, however, a hundred-Watt level and kW-level fiber lasers and/or fiber amplifier devices typically employ large-mode-area (LMA) fibers, which are often multi-mode fibers (MMF) in order to avoid nonlinear optical effects and optical damage in constituent optical fibers during the high-power operation of such devices. Accordingly, the application of conventional process(es) of fabrication of fiber couplers to optical fibers typically employed in fiber-lasers and fiber-amplifiers remains largely impractical.

The implementation of the idea of the current invention addresses both of the above-identified problems and provides a solution allowing for fabrication of a kW-level fused fiber tap coupler with the use of substantially any type of optical fiber, including a single-mode optical fiber (with a core diameter smaller than, for example, 10 microns), an LMA optical fiber (with a core diameter smaller than, for example, 30 microns), a highly-multimode optical fiber (with a core diameter up to, for example, 400 microns), and a photonic crystal fiber—all with pulled lengths substantially smaller than 5 mm.

Figure 3:
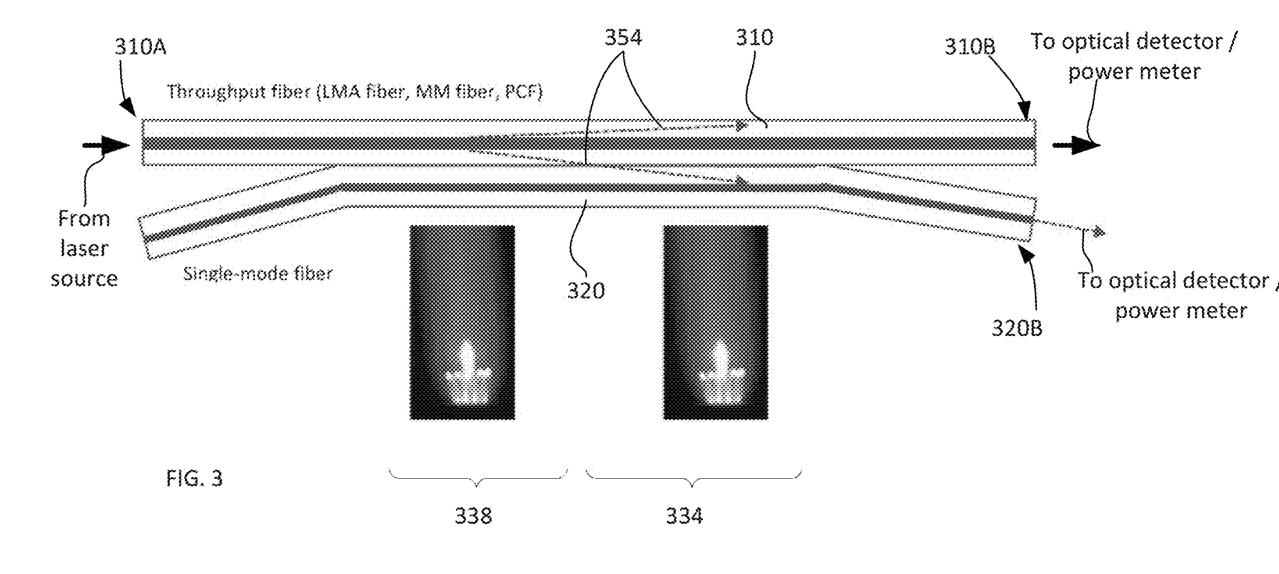
FIG. 3 is a schematic illustration of an embodiment of the present invention.

Solutions to the problem of inability of a conventional methodology of fabrication of a fiber coupler to produce, with the use of a MMF, a low-loss tap fiber coupler configured to reliably handle optical powers at a level of kWatts are characterized by employing, during the process of fabrication, a much shorter pulling length as compared to the conventional methods (0.1 to 3 mm, for example—in contradistinction of the conventional pulling lengths of 10 mm and longer), as well as the resulting substantially operationally-negligible optical transmission loss in a throughput fiber of the coupler (for a kW-level laser power transmission). FIG. 3 provides a schematic illustration of one implementation of the proposed fabrication method. The two fibers (fabricationally-combined together to form the fiber coupler that has the input end 310A, the output end 310B, and the tap end 320B and that is configured according to an embodiment of the invention) are the throughput fiber 310 and the tap/coupling fiber 320.

The essence of the proposed methodology is that, instead of a single adiabatic fiber-pulling process step employed in a typical fused biconical tapering (FBT) process, two separate and independent processing steps are used.

Figure 4:
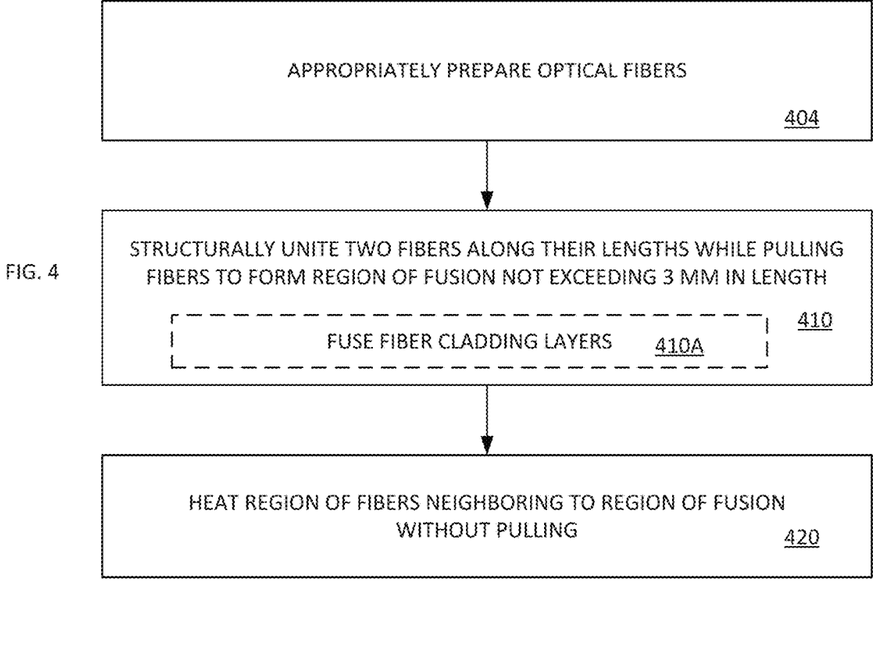
FIG. 4 is a simplified block-scheme illustrating a process of the embodiment of the invention.

In reference to FIGS. 3 and 4, at the first operational step 410, the two fibers—the throughput fiber (of substantially any type—LMA fiber, MMF, PCF) 310 and the coupling fiber 320 (typically, a SMF) are united along their lengths as a result of pulling them (as known in the art) at a very short above-identified lengths (of shorter than about 3 mm) in the chosen region 338 of the fibers 310, 320 to ensure that that the cladding layers of the two fibers are fused together, 410A. (The preparation of the fiber components undertaken, 404, before forming the fused structure typically includes removal of a section of the plastic jacket followed by cleaning of the exposed fiber surface, with no etching of the fiber cladding layer, thereby avoiding the weakening of the final structure that often accompanies this step.)

At the following processing step 420, the "upstream" (with respect to the region 338, as defined in reference to the location of the laser source used for monitoring and characterization of the resulting coupler) portion 334 of the fibers (which, in FIG. 3, is shown to the right from the region 338) is simply heated either without any fiber pulling activity. (In a related embodiment, some fiber-pulling may be used to accompany the process of heating at step 420 but, in this case, with pulling at lengths substantially shorter than 1 mm. As a result, even in the case when the "upstream" sections of the fibers (in the first region 338) are being pulled during the process of heating, the aggregate lengths/sections of the fibers that are pulled during the complete process of fabrication do not exceed 4 mm. Note that this value represents such pulled lengths of the convention FBT process at which no substantial coupling between the throughput and tap fiber modes is known to occur, see FIG. 2.) Phrased differently, as shown in FIG. 3 (drawn not to scale, as are other Figures), the section 338 of the fiber bundle is preferably heated and pulled, while the second 334 is heated without pulling. The operational temperatures at section 334 are preferably slightly lower (by at least 10 deg C.) than those at section 338, to avoid overly softening the optical fiber(s) at 334 and prevent fiber sinking. To this end, in FIG. 3 (drawn not to scale as are other Figures) the extents of regions 334, 338 are shown without geometrical precision. High-temperature heating of the fibers in the region 334 induces the diffusion of ions of doping material(s) used for doping the fiber cores. As a result of such diffusion, the mode field diameters (at the operational wavelength(s) $\lambda$ of interest) of the so-heated fibers are modified, yielding an optical power coupling/exchange from the core of the throughput fiber 310 into the core of the tap or coupling fiber 320 in the region 334, as denoted with arrows 354. The process of diffusion of the core material of 310—and, as a result, the degree to which the optical power is caused to be transferred between the fibers 310, 320—was proven to be highly controllable by controlling the time of the heating step 420.

It is understood, therefore, that the embodiment of the method of fabrication of the fiber tap coupler according to the idea of the invention includes the fusing on the constituent optical fiber is carried out in a first region along the lengths of the fibers and may satisfy at least one of the following conditions: i) the heating of the fiber in the second region (generally neighboring the first region) is varied out while being devoid of pulling any of the first and second optical fibers in such second region; ii) the heating of the fibers in such second region is accompanied by pulling the first and second optical fibers along a length not exceeding 1 mm; and iii) the fusing of the fibers in the first region includes pulling and heating the first and second optical fibers at lengths not exceeding 2 mm.

The described fabrication methodology can be applied to manufacture of fused fiber tap couplers with substantially any kind of fiber configurations.

Figure 5:
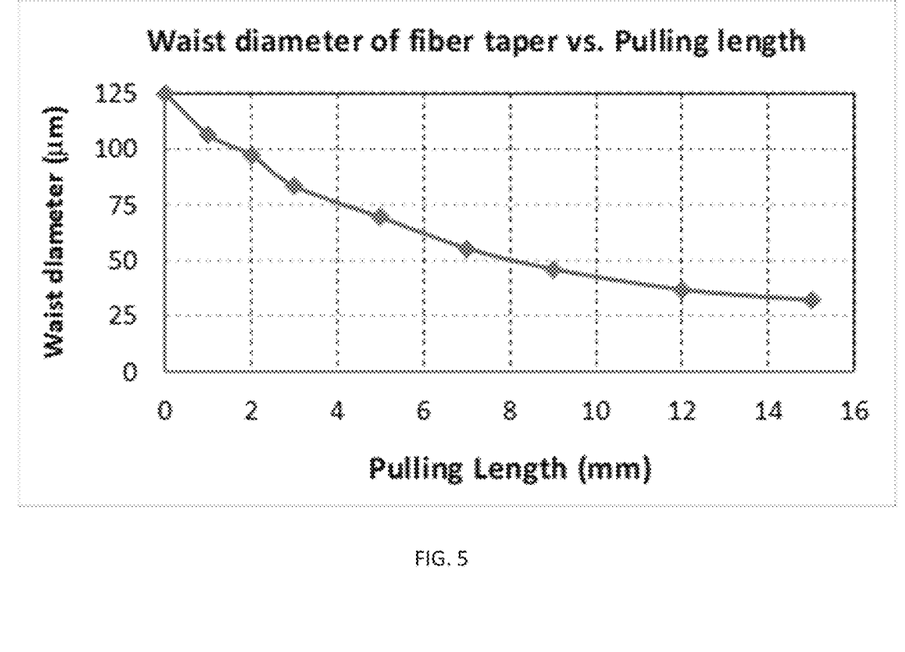
FIG. 5. provides empirical verification of a dependency of the waist diameter of a fiber taper as a function of a length along which a fiber with identified geometrical characteristics has been pulled.

FIG. 5 illustrates empirical verification of a waist diameter of a fiber taper with initial fiber diameter of 125 microns as a function of a fiber-pulling length. Conventional techniques utilize a fiber pulling length over 10 mm for fabricating fiber tap couplers, thereby yielding a waist diameter that is smaller than 50 microns. The implementation of the proposed methodology, on the other hand, when a fiber pulling length of (generally) less than 2 mm is utilized, yields a waist diameter that is much larger, thereby providing a foundation for a tap coupler utilizing large-mode-area optical fibers.

Figure 6:
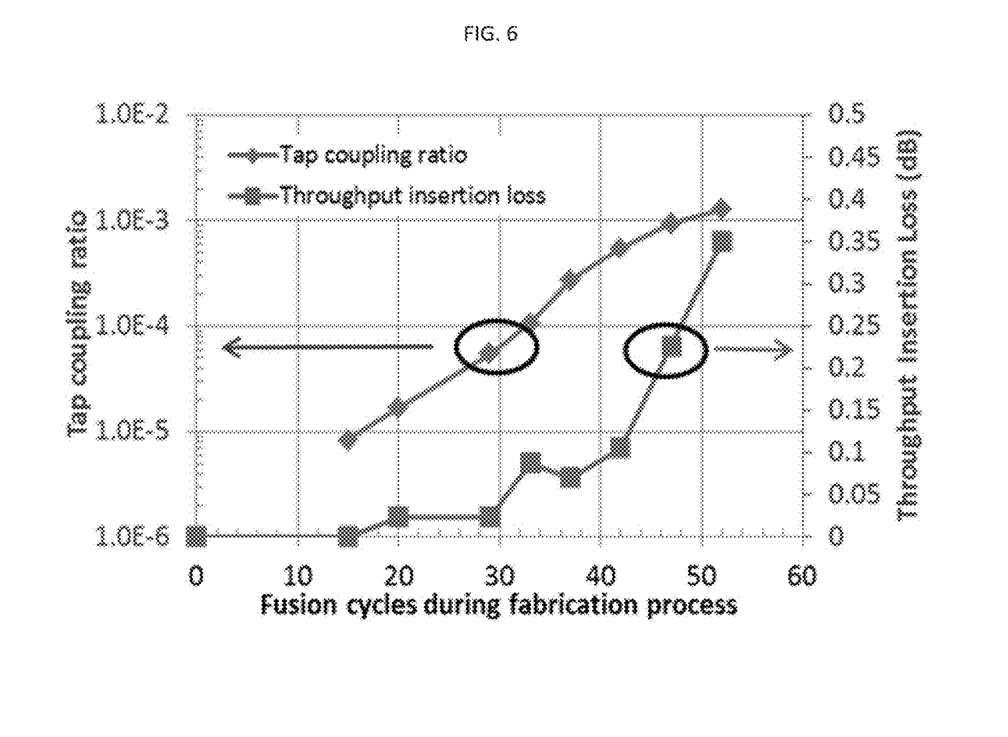
FIG. 6 depicts optical performance of the embodiment of the invention.

Data of FIG. 6 provide illustrations to optical performance of a typical high-power fiber tap-coupler that has been fabricated with the use of the disclosed methodology. Here, both the insertion loss from the throughput fiber port and the tap ratio (tap coupling ratio) are expressed as functions of the number of fusion cycles, which can be used therefore as the key parameter for controlling the manufacture process according to the embodiment of the invention. A skilled artisan will readily realize that, for example, throughput insertion losses on the order of only 0.1 dB to 0.2 dB can be readily realized while, at the same time, maintaining the tap coupling ratio at the operationally-practical level of about 1e-5 to 1e-4. Therefore, in one implementation of the embodiment of the method of the invention the process of tangibly fusing the constituent optical fibers is carried out repeating of the process of pulling and heating of the first and second optical fibers multiple times, in order to adjust said value of throughput loss to be, for example, at or below 0.1 dB while simultaneously adjusting the tap coupling ratio to be, for example, at or below $1e^{-5}$.

Figure 7:
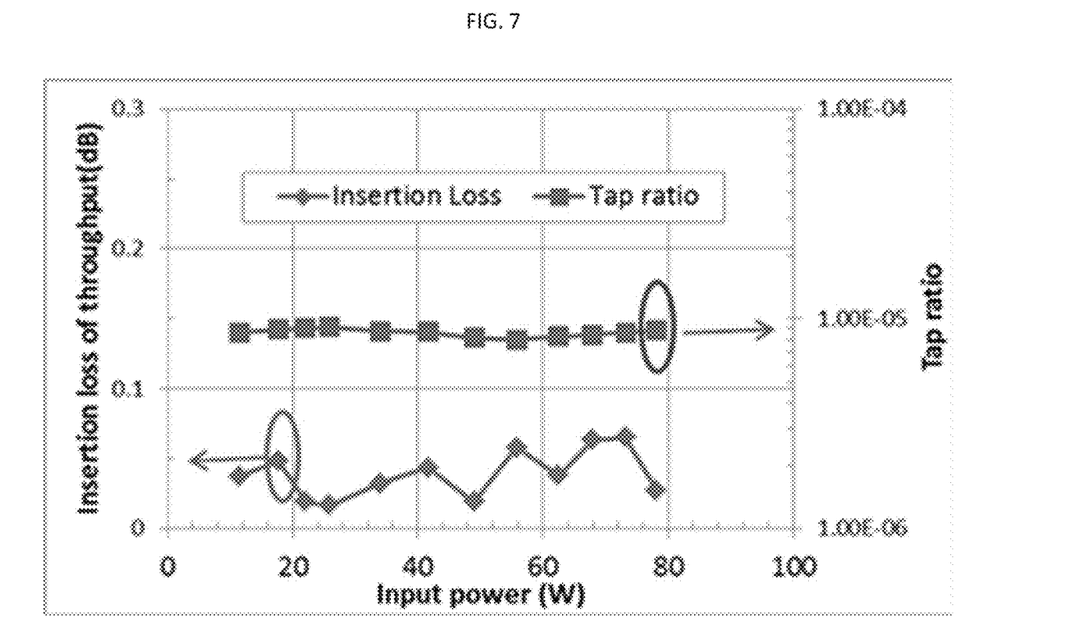
FIG. 7 provides an additional illustration to operation of the embodiment of the invention as a function of input optical power.

FIG. 7 provides plots illustrating the same operational parameters as those expressed in FIG. 6, but this time functions of input optical power, measured with a fiber tap coupler fabricated with the use of an embodiment of a method of the present invention. The empirical data prove that these characteristics remain substantially flat over a range of input optical powers from several Watts to at least 80 Watts, thereby demonstrating the operation of a large-mode diameter high-power fiber tap coupler not demonstrated to-date in related art. In a related implementation, the fiber tap coupler was configured to handle the throughput optical powers of several hundreds of Watts.

Embodiments of the present invention address the novel methodology of fabrication of a fiber tap coupler for applications in which high-Olevel optical power has to be handled. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Other specific examples of the meaning of the terms "substantially", "about", and/or "approximately" as applied to different practical situations may have been provided elsewhere in this disclosure.

An embodiment of the system generally may include electronic circuitry (for example, a computer processor and/or controller, whether or not necessarily shown in the Drawings) that governs the disclosed fabrication process and that is controlled by instructions stored in a memory, to perform specific data collection/processing and calculation steps as disclosed above. The memory may be random access memory (RAM), read-only memory (ROM), flash memory or any other memory, or combination thereof, suitable for storing control software or other instructions and data. Those skilled in the art would readily appreciate that instructions or programs defining the operation of the present embodiment(s) may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement a method of the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

The invention as recited in claims appended to this disclosure is intended to be assessed in light of the disclosure as a whole. Various changes in the details, steps and components that have been described may be made by those skilled in the art within the principles and scope of the invention.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as being limited to the disclosed embodiment(s).

The invention claimed is:

1. A method for fabricating an optical fiber coupler device that includes an input end, an output end, and a tap end, and that is characterized by a tap coupling ratio, the method comprising:
    tangibly fusing a first outer cladding of a first optical fiber with a second outer cladding of a second optical fiber by pulling and heating the first and second optical fibers at lengths not exceeding 3 mm to form a first region of structurally-integrated with one another first and second optical fibers,
and
    heating second regions of the first optical fiber and the second optical fiber, the second regions neighboring the first region,
    to configure said coupler device to transmit optical power of at least 40 Watts from the input end to the output end with a value of throughput loss of optical power not exceeding 0.2 dB,
    wherein at least one of the following conditions is satisfied:
        i) said heating the second regions is devoid of pulling any of the first and second optical fibers in a corresponding second region;
        ii) said heating the second regions is accompanied by pulling the first and second optical fibers along a length not exceeding 1 mm;
        iii) said tangibly fusing includes pulling and heating the first and second optical fibers at lengths not exceeding 2 mm.

2. The method according to claim 1, wherein said heating the second regions is carried out after said tangibly fusing the first outer cladding with the second outer cladding.

3. The method according to claim 1, wherein said tangibly fusing includes heating the first and second optical fibers at a first temperature, wherein said heating the second regions is carried out at a second temperature, and wherein the second temperature is at least 10 deg C. lower than the first temperature.

4. The method according to claim 1, wherein steps of said tangibly fusing and said heating the second regions are carried out to configure the coupler device to have the value of throughput loss of optical power not exceeding 0.1 dB across a range of input optical powers from about 10 Watts to about 80 Watts.

5. The method according to claim 1, wherein said tangibly fusing includes tangibly fusing the first and second outer claddings by repeating said pulling and heating of the first and second optical fibers multiple times, to adjust said value of throughput loss to be at or below 0.1 dB while simultaneously adjusting the tap coupling ratio to be at or below $1e^{-5}$.

6. A method for fabricating an optical fiber coupler device that includes an input end, an output end, and a tap end, and that is characterized by a tap coupling ratio, the method comprising:
  tangibly fusing a first outer cladding of a first optical fiber with a second outer cladding of a second optical fiber by pulling and heating the first and second optical fibers at lengths not exceeding 3 mm to form a first region of structurally-integrated with one another first and second optical fibers, wherein said tangibly fusing includes heating the first and second optical fibers at a first temperature,
  and
  heating second regions of the first and second optical fibers at a second temperature that is at least 10 deg C. lower than the first temperature, the second regions neighboring the first region,
  to configure said coupler device to transmit optical power of at least 40 Watts from the input end to the output end with a value of throughput loss of optical power not exceeding 0.2 dB.

7. The method according to claim 6, wherein said heating the second regions is carried out after said tangibly fusing the first outer cladding with the second outer cladding.

8. The method according to claim 6, wherein at least one of the following conditions is satisfied:
  i) said heating the second regions is devoid of pulling any of the first and second optical fibers in a corresponding second region;
  ii) said heating the second regions is accompanied by pulling the first and second optical fibers along a length not exceeding 1 mm;
  iii) said tangibly fusing includes pulling and heating the first and second optical fibers at lengths not exceeding 2 mm.

9. The method according to claim 6, wherein steps of said tangibly fusing and said heating the second regions are carried out to configure said coupler device to have said value of throughput loss of optical power not exceeding 0.1 dB across a range of input optical powers from about 10 Watts to about 80 Watts.

10. The method according to claim 6, wherein said tangibly fusing includes tangibly fusing the first and second outer claddings by repeating said pulling and heating of the first and second optical fibers multiple times, to adjust said value of throughput loss to be at or below 0.1 dB while simultaneously adjusting the tap coupling ratio to be at or below $1e^{-5}$.

11. A method for fabricating an optical fiber coupler device that includes an input end, an output end, and a tap end, and that is characterized by a tap coupling ratio, the method comprising:
  tangibly fusing a first outer cladding of a first optical fiber with a second outer cladding of a second optical fiber by pulling and heating the first and second optical fibers at lengths not exceeding 3 mm to form a first region of structurally-integrated with one another first and second optical fibers,
  and
  heating second regions of the first and second optical fibers, the second regions neighboring the first region,
  to configure said coupler device to transmit optical power of at least 40 Watts from the input end to the output end with a value of throughput loss of optical power that does not exceed 0.2 dB and wherein said value of throughput loss does not exceed 0.1 dB across a range of input optical powers from about 10 Watts to about 80 Watts.

12. The method according to claim 11, wherein said heating the second regions is carried out after said tangibly fusing the first outer cladding with the second outer cladding.

13. The method according to claim 11, wherein at least one of the following conditions is satisfied:
  i) said heating the second regions is devoid of pulling any of the first and second optical fibers in a corresponding second region;
  ii) said heating the second regions is accompanied by pulling the first and second optical fibers along a length not exceeding 1 mm;
  iii) said tangibly fusing includes pulling and heating the first and second optical fibers at lengths not exceeding 2 mm.

14. The method according to claim 11, wherein said tangibly fusing includes heating the first and second optical fibers at a first temperature, wherein said heating the second regions is carried out at a second temperature, and wherein the second temperature is at least 10 deg C. lower than the first temperature.

15. The method according to claim 11, wherein said tangibly fusing includes tangibly fusing the first and second outer cladding by repeating said pulling and heating of the first and second optical fibers multiple times, to adjust the value of throughput loss to be at or below 0.1 dB while simultaneously adjusting the tap coupling ratio to be at or below $1e^{-5}$.

16. A method for fabricating an optical fiber coupler device that includes an input end, an output end, and a tap end, and that is characterized by a tap coupling ratio, the method comprising:
  tangibly fusing a first outer cladding of a first optical fiber with a second outer cladding of a second optical fiber by pulling and heating the first and second optical fibers at lengths not exceeding 3 mm to form a first region of structurally-integrated with one another first and second optical fibers, and
  heating second regions of the first and second optical fibers, the second regions neighboring the first region,
  wherein said pulling and heating of the first and second optical fibers is repeated multiple times to configure the coupler device to transmit optical power of at least 40 Watts from the input end to the output end with a value of throughput loss of optical power to be at or below 0.1 dB while simultaneously adjusting the tap coupling ratio to be at or below $1e^{-5}$.

17. The method according to claim 16, wherein at least one of the following conditions is satisfied:
  i) said heating the second regions is devoid of pulling any of the first and second optical fibers in a corresponding second region;

ii) said heating the second regions is accompanied by pulling the first and second optical fibers along a length not exceeding 1 mm;

iii) said tangibly fusing includes pulling and heating the first and second optical fibers at lengths not exceeding 2 mm.

18. The method according to claim 16, wherein said tangibly fusing includes heating the first and second optical fibers at a first temperature, wherein said heating the second region is carried out at a second temperature, and wherein the second temperature is at least 10 deg C. lower than the first temperature.

19. The method according to claim 16, wherein steps of said tangibly fusing and said heating the second region are carried out to configure said coupler device to have the value of throughput loss of optical power not exceed 0.1 dB across a range of input optical powers from about 10 Watts to about 80 Watts.

* * * * *

UNITED STATES PATENT AND TRADEMARK OFFICE
CERTIFICATE OF CORRECTION

| | | |
|---|---|---|
| PATENT NO. | : 11,061,188 B1 | Page 1 of 1 |
| APPLICATION NO. | : 16/806237 | |
| DATED | : July 13, 2021 | |
| INVENTOR(S) | : Jihong Geng, Bryson Case and Shibin Jiang | |

It is certified that error appears in the above-identified patent and that said Letters Patent is hereby corrected as shown below:

On the Title Page

Column 1, item (73) Assignee:
"AD VALUE PHOTONICS, INC."

Should read:
-- ADVALUE PHOTONICS, INC. --

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*